Figure 1:
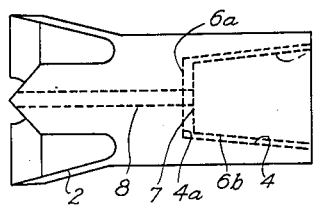

Dec. 26, 1933.    R. A. BEDFORD    1,941,289

ROCK DRILL

Filed May 1, 1930

R. A. Bedford
INVENTOR

By: Munds & Clark
ATTYS.

Patented Dec. 26, 1933

1,941,289

UNITED STATES PATENT OFFICE 1,941,289

ROCK DRILL

Reginald Asline Bedford, Sheffield, England

Application May 1, 1930, Serial No. 448,982, and in the Union of South Africa March 14, 1930

2 Claims. (Cl. 255—64)

In rock drills of the percussive type which comprise a bit or cutter head at one end and are adapted to be coupled to a pneumatic hammer or the like at the other end it is customary to make the bit integrally with the body of the drill. A drill of this kind possesses the disadvantage that a type of "cutting" steel suitable for the formation of the bit is not suited to withstand the stress to which the body and shank of the drill are subjected, whilst if the drill is made of steel suitable for the formation of the shank the bit has not the best "cutting" qualities.

Although it has heretofore been proposed to make parts of the drill, e. g., the bit and the body, separately, each of a type of steel suitable to their particular requirements, and to secure them together by various means, such means have been unsuccessful in practice, owing to the fact that the bit invariably worked loose upon the drill and was consequently ineffective.

It is thought that such failures were due to the constant jar or reaction set up between the two contacting hard surfaces of the bit and the body or shank under the stress and shocks to which they were subjected.

In a previous construction it has been proposed to form the end of the drill shaft with a socket and line the taper socket with papier mâché or other suitable material, into which the tapered shank of a detachable bit is inserted. This construction is costly because the end of the drill shaft has to be specially constructed and is inefficient in use because unless the shank of the bit fits exactly right into the socket, it will be too loose, or if too tight, the cutting edges which should be supported on the shank, will stand away and will probably break off in use. In order to overcome this difficulty, it was proposed to make the socket and shank oval in form so that a rotary drive can be transmitted even though the shank was a fairly loose fit in the socket. In order to enable the tight shanks to be removed, the drill shaft had to be provided with a driftway which, apart from additional cost, weakens the shank.

The object of this invention is to provide a detachable bit and rock drill shaft which in use are simple and securely fastened together so as to transmit a rotary motion as well as the percussive blows without any additional securing means but at the same time can be readily detached when the bit has worn out without damaging the shaft and without having to use special tools for the purpose.

In rock drills according to this invention a removable bit is provided having an axially holed taper socket fitted with a soft metal axially holed taper liner to receive the tapered end of a drill shaft. It will be obvious that the percussive blows will wedge the shaft into the socket, the soft metal liner yielding slightly to take up irregularities, during which process the drill shaft makes a slight axial movement into the socket.

After the first few blows the socket becomes firmly wedged onto the end of the drill shaft and it has been found that to move the bit by direct pull will require a force of many tons. The bit can, however, be easily removed by striking the wall of the socket with a hammer when the socket is resting on an anvil or some sufficiently solid support.

According to a further feature of the invention the wall of the socket is made relatively thin so that whilst being of sufficient strength to withstand the wedging action, it can be easily deformed by the said hammer blows to assist in its removal, thus making it easily removable. It will be obvious that the bit will only be removed when it is worn out and of no further value; consequently, damage to the bit during removal does not matter. The liner between the bit and the shaft prevents the hammer blows from damaging the shaft. In order to transmit the percussive blows directly to the bit, the taper of the parts should be designed so that the end of the shaft, when firmly wedged into the socket, abuts against the socket, and a layer of soft metal may be disposed between the end of the shaft and the abutment on the socket so that the jar and vibration on the drill shaft caused by contact between the bit and the rock is to some extent cushioned by the soft metal.

In its preferred form, the said cushioning member comprises a thin liner or bush of a comparatively soft metal, e. g., copper, lead, soft iron or the like, which is interposed between the two hard surfaces of the jointed parts, but it will be understood that any material or composition which is relatively softer than the steel of which the parts of the tool are made may be employed for the purpose.

Figure 2:
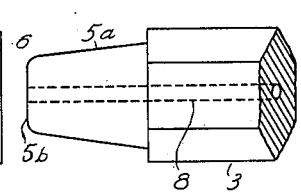
Figure 3:
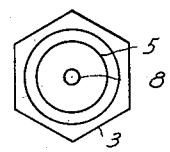
Figure 4:
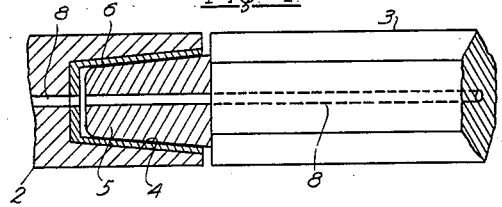
Figure 5:
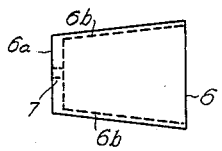
Figure 6:
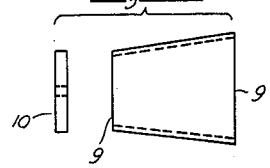

Various embodiments of the invention are illustrated in the accompanying drawing wherein Fig. 1 is an elevation of the bit or cutter of a rock drill, Fig. 2 a similar view of the end of the body of the drill, and Fig. 3 an end view thereof. Fig. 4 shows the bit or cutter secured upon the body of the drill, Fig. 5 is a detail view of a thimble or liner according to the invention and Figs. 6 are similar views of a modified liner or bush.

Referring to Figs. 1 to 5, 2 indicates the bit or cutter of a hollow rock drill and 3 the body of the drill at the end thereof remote from the usual collared shank, which is not shown. 4 indicates a tapered socket provided axially in the bit 2 and 5 a tapered spigot or extension similarly formed upon the end of the body of the drill 3. The bit socket 4 is provided with a fitted liner or bush consisting of a copper thimble 6 (shown separately at Fig. 5) perforated at its end at 7 to preserve the continuity of the customary fluid duct 8 through the drill.

In use, the bit 2 with the thimble 6 in situ is driven tightly on to the spigot 5 and the comparative softness of the copper thimble 6 permits it to adapt itself to any irregularities upon the co-acting surfaces 4 and 5a of the socket and spigot 5, respectively, in such manner as to provide a perfectly continuous joint between the same, whilst also constituting a cushioning medium for the absorption of shocks which would otherwise tend to loosen the parts, which, in this embodiment, adhere firmly in use.

The end 6a of the thimble 6 is preferably substantially thicker than its wall 6b and the parts are so proportioned that when the end 5b of the tapered spigot 5, which is conveniently rounded as shown, is in contact with the end 6a of the thimble 6 the whole interior surface of the latter is in contact with said spigot 5 and its exterior surface in contact with the socket 4 of the bit or cutter.

The bit 2 can be readily removed from the drill 3 by any suitable means. A convenient method whereby this can be effected is by employing a heavy sleeve-like object, e. g., a discarded chuck of the kind used in pneumatic hammers and the like, or any other suitable weight adapted to embrace the drill, holding the drill in a vertical position with the bit lowermost and dropping the chuck or the like violently upon the bit until the same is loosened. The removal of the bit may be facilitated by the provision of lugs on the body of the drill and the use of a forked wedge operating between said lugs and the cutter head.

If desired, the thimble 6 may be replaced by a tapered liner or bush 9 used in conjunction with a perforated disc or washer 10, as illustrated in Fig. 6 although said disc or washer 10 may be omitted if desired, the end 5b of the tapered spigot 5 of the body of the drill then contacting directly with the base 4a of the bit socket 4.

The liner or bush 6 may be applied by pressing a suitable disc into the bit socket 4 and the spigoted end 5 of the body of the drill 3 may be employed for this purpose. According to another method, the liner or bush may be run in between the surfaces of the parts to be joined in a molten condition, the parts being held apart by suitable means so as to be separated at the correct distance. In this case the parts may be disassembled by heating and melting out the liner.

In an alternative modification, the bit or cutter may be formed of composite steel and iron or other suitable softer metal, so arranged that the portion in contact with the tapered end of the body of the drill is of the softer material, which thus serves the purpose of a cushioning medium, thereby dispensing with a separate bush or liner.

By the employment of a cushioning member as herein described, it will readily be seen that the bit or cutter may be made of a type of steel most adapted to withstand the abrasive action of drilling, the shank end of a material best calculated to receive the percussive blows of the pneumatic hammer or the like, whilst the body of the drill may be formed from material most suitable for transmitting the blow of the tool to the bit or cutter, thus prolonging the life of the whole tool, since the shank and body of the drill may remain in use so long as they are unaffected by fatigue, the bits or cutters being replaced as they become worn out.

Many other advantages accruing from the use of this device are apparent. Of these the chief are (i) that the adoption of a cushioning medium between the jointed parts of a drill tends to prevent fatigue of the material by the absorption of the percussive waves or vibrations which, returning along the drill from the bit or cutter, meet those advancing from the opposite direction, so as to cause fractures in drills of the type hitherto employed, and (ii) that the use of separate bits or cutters permits considerable economy in the transport of drills to the working places.

What I claim and desire to secure by Letters Patent is:—

1. In rock drills, a removable bit having an axially holed taper socket fitted with a soft metal axially holed taper liner to receive the tapered end of a drill shaft, the taper on said socket and liner being such relatively to the taper on the shaft that the parts become solidly wedged together in use, wherein an abutment is provided in the socket of the bit against which the end of the shaft can bear after the said wedging action, and wherein a layer of soft metal is disposed between the end of the shaft and the abutment in the socket.

2. In rock drills, a removable bit having an axially holed taper socket fitted with a soft metal axially holed taper liner to receive the tapered end of a drill shaft, the taper on said socket and liner being such relatively to the taper on the shaft that the parts become solidly wedged together in use, wherein an abutment is provided in the socket of the bit against which the end of the shaft can bear after the said wedging action, wherein a layer of soft metal is disposed between the end of the shaft and the abutment in the socket, and wherein said liner and further abutment are made of copper.

REGINALD ASLINE BEDFORD.